(No Model.) 5 Sheets—Sheet 1.

W. B. CHAMBERS & J. KAYLOR.
CHECK ROW CORN PLANTER.

No. 361,613. Patented Apr. 19, 1887.

Witnesses:
E. R. Richards
R. P. Hunter

Inventors:
Wm. B. Chambers
John Kaylor
By W. B. Richards, Atty.

(No Model.) 5 Sheets—Sheet 3.

W. B. CHAMBERS & J. KAYLOR.
CHECK ROW CORN PLANTER.

No. 361,613. Patented Apr. 19, 1887.

Witnesses:
P. R. Richards.
R. P. Hunter,

Inventors:
Wm. B. Chambers &
John Kaylor,
By W. B. Richards
Atty.

(No Model.) 5 Sheets—Sheet 4.

W. B. CHAMBERS & J. KAYLOR.
CHECK ROW CORN PLANTER.

No. 361,613. Patented Apr. 19, 1887.

Witnesses:
S. R. Richards.
R. P. Hunter.

Inventors:
Wm. B. Chambers &
John Kaylor,
By W. B. Richards,
atty.

(No Model.) 5 Sheets—Sheet 5.

W. B. CHAMBERS & J. KAYLOR.
CHECK ROW CORN PLANTER.

No. 361,613. Patented Apr. 19, 1887.

Witnesses:
S. R. Richards.
B. P. Hunter.

Inventors:
Wm. B. Chambers &
John Kaylor,
By W. B. Richards,
Atty.

UNITED STATES PATENT OFFICE.

WILLIAM B. CHAMBERS AND JOHN KAYLOR, OF DECATUR, ILL., ASSIGNORS TO THE CHAMBERS, BERING, QUINLAN COMPANY, OF SAME PLACE.

CHECK-ROW CORN-PLANTER.

SPECIFICATION forming part of Letters Patent No. 361,613, dated April 19, 1887.

Application filed February 8, 1887. Serial No. 226,959. (No model.)

*To all whom it may concern:*

Be it known that we, WILLIAM B. CHAMBERS and JOHN KAYLOR, citizens of the United States, residing at Decatur, in the county of Macon and State of Illinois, have invented certain new and useful Improvements in Check-Row Corn-Planters, of which the following is a specification.

Our invention relates to check-row corn-planters of that type shown and described in Letters Patent No. 340,511, issued April 20, 1886, to John Kaylor, one of the present applicants; and this invention consists in improved means for raising and lowering the runners and seed-dropping devices, in improved means for adjusting the covering or gage wheels, and in improvements in the wheel-scrapers, all as hereinafter described and claimed.

Figure 1:
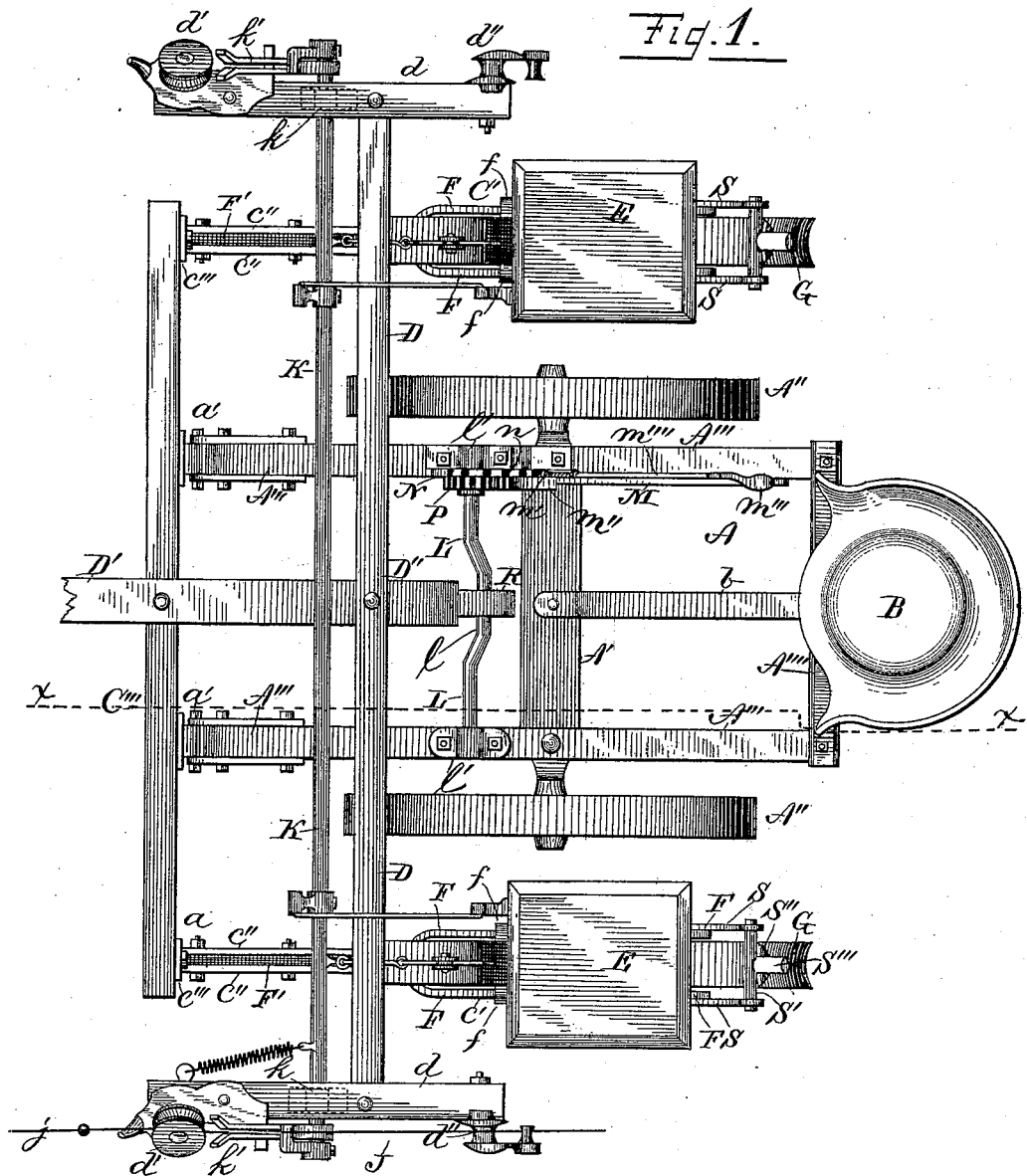
Figure 2:
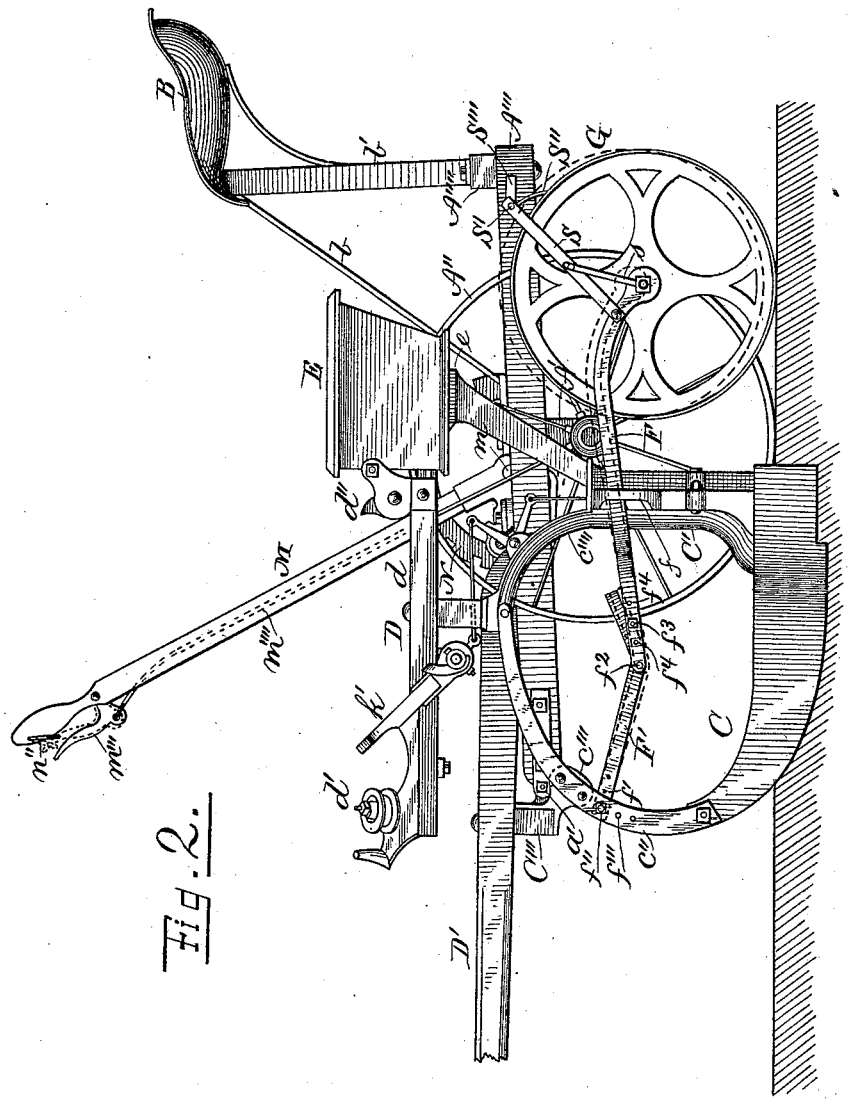
Figure 3:
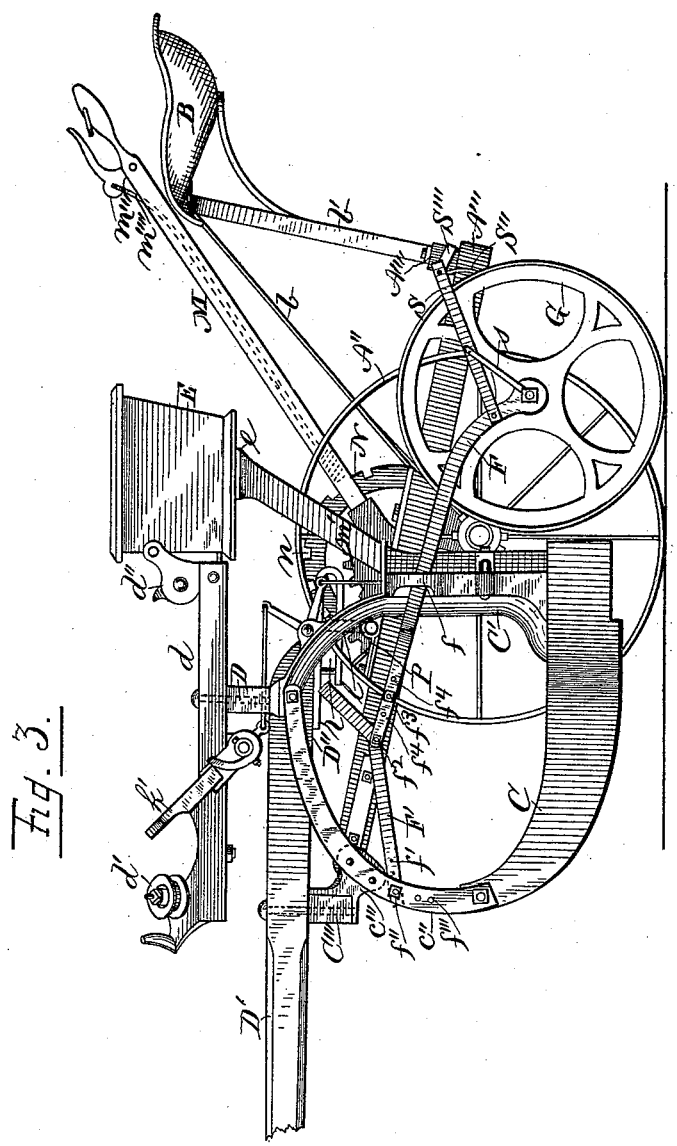
Figure 4:
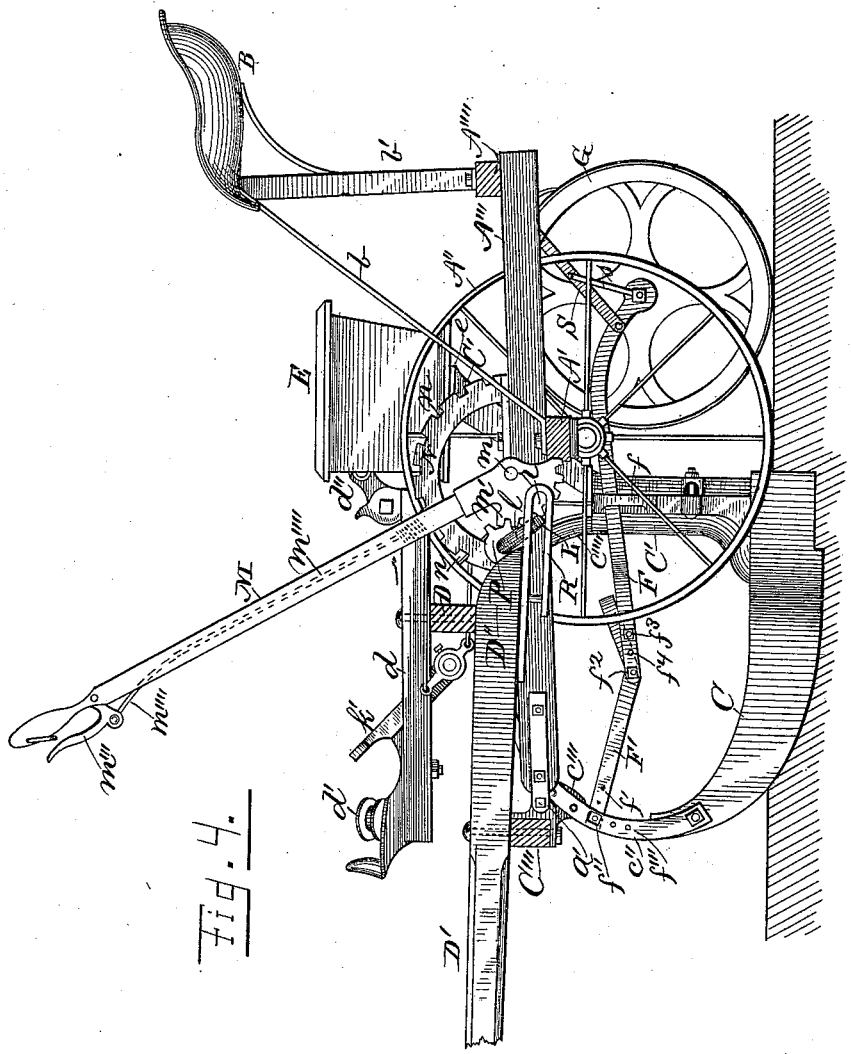
Figure 5:
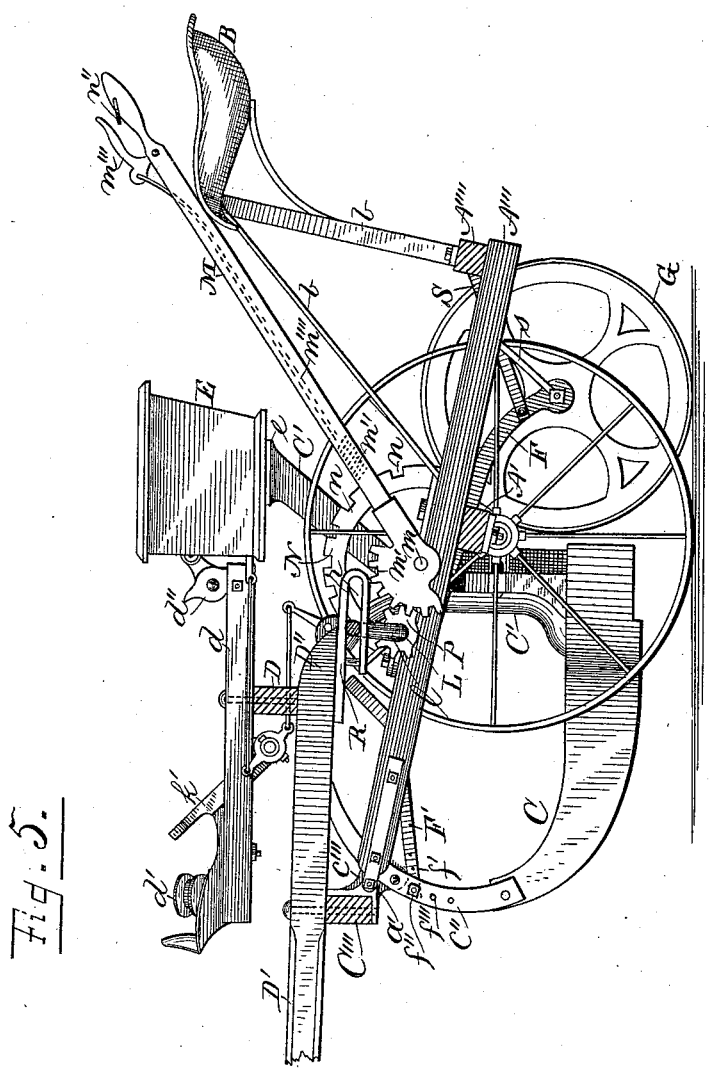

In the accompanying drawings, which illustrate one method of applying our invention, Figure 1 is a top plan; Fig. 2, a side elevation showing the seeding devices lowered as in operation in planting; Fig. 3, a side elevation showing the seeding devices elevated for moving the planter when not in operation; Fig. 4, a sectional elevation in line $xx$ in Fig. 1; Fig. 5, an elevation in same sectional plane as Fig. 4, but showing the seeding devices raised, as in Fig. 3.

The parts of the planter to which our present improvements are applied may be very briefly described as follows:

A is the rear frame, formed of an arched axle, A′, supported on wheels A″, side bars, A‴, fixed to axle A′, transverse bar A″″, and supports a seat, B, on bars $b$ $b'$, which rest on and are secured to the axle and bar A″″, respectively. The forward frame consists of the runners or furrow-openers C, seed-tubes C′, transverse bars C‴ D, and tongue or draft-pole D′. The rear frame side bars, A‴, are hinged at their forward ends to the bar C‴ by hinges $a'$, so as to permit the forward frame to rise and lower at its rear end, and to swing in a vertical plane on the hinges $a'$ and the attachment to the neck-yoke, and to permit of the rear frame being oscillated on the axle when the forward frame is raised to permit and to aid in raising the forward frame. The tongue D′ is fixed to the bars D and C‴.

The forward and upper end of each runner C is bolted and fixed between bars $c''$, which extend upward and rearward, and are bolted and fixed at their other ends to the bar D. The bar C‴ is extended laterally, and has pendants $c'''$ at its ends, which are bolted and fixed, respectively, to the bars $c''$. This extension of the bar C‴ is such as to locate the runners C on the outer sides of the wheels A″. A branch, $c''''$, extends from the seed-tube and connects with the bar D. Thus the parts of the forward frame are rigidly connected with each other. The bar D is extended laterally beyond the runners and supports the check-rower devices, as shown and described in said Letters Patent No. 340,511. The lower portion of each seed-tube is vertical, and the upper part inclined rearward, where it has flanges $e$, by means of which it is bolted to the seed-box E.

The bar D has a cross-head, $d$, on each of its ends, which support the guide-pulleys $d'$ $d''$ for the check-row line J, having tappets or dropping-indexes $j$.

K is the rock-shaft, journaled in bearings $k$, which are fixed to the heads $d$, and has a forked lever, $k'$, on each of its ends.

The planter hereinbefore described by letter is substantially the same as shown and described in the Kaylor patent hereinbefore referred to, and need not be more fully described herein. The means shown in the drawings herewith for transmitting motion from the rock-shaft K to the seed-slides and dropping-valves are also the same as shown in said patent.

L is a shaft bent at its central portion to form a crank, $l$, and is journaled at its ends in suitable bearings, $l'$, on the bars A‴, forward of the axle A′.

M is a hand-lever journaled at $m$ to one of the bars A‴, or to any suitable plate connected therewith, and has fixed to or formed upon its lower end a segmental gear, $m'$, and has also a spring-actuated bolt, $m''$, operated in an ordinary manner by a thumb-lever, $m'''$, and rod $m''''$.

N is an arc-shaped rack-bar fixed to a bar, A‴, at the side of the lever M, where the bolt $m''$ may engage with its notches $n$.

P is a segmental pinion fixed to and near the end of the crank-shaft L and in gear with the segment $m'$.

The rear end, D'', of the tongue D' extends in rear of the bar D, and carries a rearwardly-extending plate, R, which has a horizontal slot, $r$, lengthwise of the tongue. This slot may be formed, as shown, of a bent bar or in any other suitable manner. The crank $l$ passes through the slot $r$, and can slide lengthwise of said slot.

By turning the lever M to the rear, as shown at Figs. 3 and 5, the forward end of the rear frame and the entire forward frame and the seeding devices will be elevated, so that the runners C will be entirely above the ground, in which position they will be held by the bolt $m''$ engaging with one of the notches $n$ in the rack-bar, and the planter may be turned around and otherwise moved as desired. By turning the lever M forward, as shown at Figs. 2 and 4, the runners, the forward end of the rear frame, and the forward frame and seeding devices will be lowered to force the runners C into the ground in proper position to open the furrow for the seed, and the depth to which they penetrate the soil may be regulated by engaging the bolt $m''$ with different ones of the notches $n$, and when so engaged the lever M will act as a lock-lever to hold the runners in the ground. When desired, the bolt $m''$ may be held by the hand of the driver, by means of the thumb-lever $m'''$, out of contact with the rack-bar N; or it may be held out of contact therewith by a link, $n''$, as shown by dotted lines at Fig. 2, and permit the lever to oscillate and the forward frame of the planter to rise and fall in passing over obstructions, or in other circumstances, when desired. This method of raising and lowering the forward frame in this type of planter is simple, strong, and effective, and renders the manipulation of the planter in this respect very easily effected.

A covering-wheel, G, journaled in the rear ends of bars F F, runs behind each seed-tube C', and the bars F pass one on each side of each seed-tube loosely through loops or staples $f$, and are connected at their forward ends each pair of bars F to the rear end of a bar, F', the forward end of which has a series of holes, $f'$, through which a bolt, $f''$, passes to secure it in one of a series of holes, $f'''$, between the bars $c''$, in same manner as shown and described in said Kaylor patent, except in the manner of uniting the bars F and F', which in our invention are united by a pivot-bolt, $f^2$. The bar F' is bent upwardly and extended in rear of the pivot $f^2$, and a bolt, $f^3$, is passed through beneath the bar F' in one of a series of holes, $f^4$, in the bars F. By this means the efficiency of the wheels G as gage-wheels for regulating the depth of planting is greatly increased. By locating the bolt $f^3$ in the rear one of the holes $f^4$ the wheel G may be raised relatively to the seed-tube, as shown by dotted lines at Fig. 2, and thus the runners be permitted to penetrate the soil deeper, and the farther forward the bolt $f^3$ is located in the series of holes $f^4$ the higher plane the runners will be held in. When the bolt $f^3$ is in either of the series of holes $f^4$, the joint $f^2$ will be free and permit the runners and forward frame to raise to pass over obstacles of any kind, and when the runners and forward frame are elevated this joint $f^2$ will permit the wheels G to drop to and run on the surface of the ground, as shown at Figs. 3 and 5.

Bars S extend upwardly and rearwardly, one from each bar F, and are braced by bars $s$. A bar, S', is journaled in the rear upper ends of the bars S, and carries a scraper, S'', which fits the peripheral face of the wheel G, and rests thereon by force of its own gravity. A foot-pedal, S''', projects from the bar S', and the driver may place his foot thereon and press the scraper to the wheel when extra force is required to clean it.

Having thus described our invention, what we claim as new, and desire to secure by Letters Patent, is—

1. In a corn-planter, in combination, a rear frame mounted on wheels, a forward frame carrying the seeding devices and runners or furrow-openers, a tongue fixed to the forward frame, a hinge-connection between said frames, located approximately at the front ends of both the forward and rear frames, a shaft extending across the rear frame and provided with a crank, and a rear extension of the tongue provided with a slot in which said crank operates to raise and lower the forward frame, substantially as described.

2. In a corn-planter, in combination, a rear frame mounted on wheels, a forward frame carrying the seeding devices and runners or furrow-openers, a tongue fixed to the forward frame and provided with a slotted extension in rear of said frame, a hinge-connection between said frames, located approximately at the front ends of both the forward and rear frames, and a shaft extending across the rear frame and provided with a crank which operates in the rear slotted end of the tongue, and further provided with a pinion which gears with a segmental pinion carried by a hand-lever, by means of which said crank-shaft may be operated, substantially as described.

3. In a corn-planter, in combination, a rear frame mounted on wheels, a forward frame carrying the seeding devices and runners or furrow-openers, a tongue fixed to the forward frame and provided with a slotted extension in rear of said frame, a hinge-connection between said frames, located approximately at the front ends of both the forward and rear frames, and a shaft extending across the rear frame and provided with a crank which operates in the rear slotted end of the tongue, and further provided with a pinion which gears with a segmental pinion carried by a locking hand-lever, by means of which said crank-shaft may be operated, substantially as described.

4. In a corn-planter, in combination, a rear frame mounted on wheels, a forward frame carrying the seeding devices and runners or furrow-openers, a tongue fixed to the forward frame and provided with a slotted extension in rear of said frame, a hinge-connection between said frames, located approximately at the front ends of both the forward and rear frames, a shaft extending across the rear frame forward of the axle A' and bent to form a crank at its mid-length portion, which crank operates in the slotted extension of the tongue, and further provided with a segmental pinion, P, at one of its ends, and a hand-lever having a segmental pinion, $m'$, which gears with the pinion P, substantially as and for the purpose specified.

5. In a corn-planter, in combination, a rear frame mounted on wheels, a forward frame carrying the seeding devices and runners or furrow-openers, a tongue fixed to the forward frame and extended in rear thereof and provided with a slotted extension, R, a hinge-connection, $a'$, between said frames, located approximately at the front ends of both the forward and rear frames, a shaft, L, bent to form a crank, $l$, which operates in the slotted extension R, a segmental pinion, P, fixed to the shaft L, and a hand-lever, M, provided with a segmental pinion, $m'$, which gears with the pinion P, substantially as and for the purpose specified.

6. In a corn-planter, in combination, a rear frame mounted on wheels, a forward frame carrying the seeding devices and runners or furrow-openers, a tongue fixed to the forward frame, extended in rear thereof and provided with a slotted extension, R, a hinge-connection, $a'$, between said frames, located approximately at the front ends of both the forward and rear frames, a shaft, L, bent to form a crank, $l$, which operates in the slotted extension R, a segmental pinion, P, fixed to the shaft L, a rack-bar, N, and a hand-lever, M, provided with a segmental pinion, $m'$, which gears with the pinion P, and a spring-actuated bolt, $m''$, rod $m''''$, and thumb-lever $m'''$, substantially as and for the purpose specified.

7. In a corn-planter, in combination with the runners or furrow-openers, the seed-tubes and gage-wheels G, the bars F, to the rear ends of which the gage-wheels are journaled, and the bent bar F', hinged or pivoted at its forward end to the runner and forward of its rear end to the forward end of the bars F, and a bolt, $f^3$, which may be inserted in either of the series of holes $f^4$, substantially as and for the purpose specified.

8. In a corn-planter, in combination, runners C, seed-tube C', gage-wheel G, bars F, with holes $f^4$, bent bar F', hinged or pivoted to the bars F, and bolt $f^3$, substantially as and for the purpose specified.

9. In a corn-planter, in combination, a rear frame mounted on wheels, a forward frame carrying the seeding devices and runners or furrow-openers C and seed-tubes C', a hinge-connection between said frames, which permits of elevating and lowering the forward frame, gage-wheel G, bars F, with holes $f^4$, and bar F', hinged to the runners and hinged to the bars F, and bolt $f^3$, substantially as and for the purpose specified.

10. In a corn-planter, in combination with a gage-wheel, G, journaled in swinging bars F, a gravitating scraper, S'', fixed to a bar, S', journaled in the outer ends of bars S, which are fixed to and project from the bars F, and a foot-pedal, S''', fixed to the scraper or bar S, substantially as and for the purpose specified.

In testimony whereof we affix our signatures in presence of two witnesses.

WILLIAM B. CHAMBERS.
JOHN KAYLOR.

Witnesses:
JOHN B. PRESTLEY,
HENRY A. WOOD.